United States Patent
DeCusatis et al.

(10) Patent No.: US 7,190,904 B2
(45) Date of Patent: Mar. 13, 2007

(54) WAVELENGTH MODULATION FOR OPTICAL BASED SWITCHING AND ROUTING

(75) Inventors: Casimer M. DeCusatis, Poughkeepsie, NY (US); Lawrence Jacobowitz, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 894 days.

(21) Appl. No.: 09/964,190

(22) Filed: Sep. 26, 2001

(65) Prior Publication Data

US 2003/0059157 A1    Mar. 27, 2003

(51) Int. Cl.
H04B 10/08 (2006.01)
H04B 10/00 (2006.01)
H04B 10/04 (2006.01)
H04J 14/02 (2006.01)

(52) U.S. Cl. .......................... 398/95; 398/33; 398/158; 398/162; 398/196; 398/198

(58) Field of Classification Search ................. 398/95, 398/158, 162, 163, 33, 195, 196, 198, 197
See application file for complete search history.

(56) References Cited

U.S. PATENT DOCUMENTS

| | | | | |
|---|---|---|---|---|
| 5,777,773 | A * | 7/1998 | Epworth et al. | 398/185 |
| 6,459,519 | B1 * | 10/2002 | Sasai et al. | 398/183 |
| 6,597,840 | B2 * | 7/2003 | Jacobowitz et al. | 385/37 |
| 6,661,974 | B1 * | 12/2003 | Akiyama et al. | 398/95 |
| 6,674,558 | B1 * | 1/2004 | Chang et al. | 370/352 |
| 6,738,187 | B2 * | 5/2004 | DeCusatis et al. | 359/344 |
| 6,751,014 | B2 * | 6/2004 | DeCusatis et al. | 359/341.41 |

OTHER PUBLICATIONS

Carroll, J., et al.,"Distributed feedback semiconductor lasers," The Institution of Electrical Engineers, London, United Kingdom, pp. 9-15, (1998).
Kartalopoulos, S., "Introduction to DWDM Technology Data in a Rainbow," SPIE Optical Engineering Press, Bellingham, Washington, IEEE Press, pp. 67-68, (1999).
Bann, R., et al.,"Micromaching system accommodates large wafers," Laser Focus World, The 2001 Annual Survey of the Laser Marketplace, pp. 189-192, (Jan. 2001).
"Other Optical Components, Distributed feedback semiconductor lasers," Chapter 9, IEE Circuits, Devices and Systems Seriers 10, vol. PM52, pp. 131-137.

* cited by examiner

Primary Examiner—Dalzid Singh
(74) Attorney, Agent, or Firm—Scully, Scott, Murphy & Presser, P.C.; Lisa U. Jaklitsch, Esq.

(57) ABSTRACT

A method and system for modulating an optical signal to encode data therein. The method comprises the steps of directing the optical signal through a filter mechanism having a passband function including a center wavelength, and modulating the center wavelength of the optical signal to establish a difference between the center wavelengths of the filter mechanism and the optical signal to represent a data value. With the preferred implementation of the invention, a transmit device is used to encode the data in the optical signal, and a receive device is provided to decode the signal. The transmit device modulates the center wavelength of the optical signal to establish a difference between the center wavelength and a predefined wavelength to encode data in the optical signal, and the transmit device then transmits the optical signal. The receive device receives the optical signal from the transmit device and processes that signal to identify the encoded data.

3 Claims, 3 Drawing Sheets

MPLS/RSVP Modulator in Each
Network Node, Transmit Side

WAVELENGTH MODULATION FOR OPTICAL BASED SWITCHING AND ROUTING

BACKGROUND OF THE INVENTION

1. Field of the Invention

This invention generally relates to distributing control information throughout optical networks. More specifically, the invention relates to modulating the optical signals transmitted within an optical network to encode control information in those optical signals.

2. Prior Art

There are many ways to modulate information onto an optical fiber communication system, including amplitude, phase, and frequency modulation. Recent advances in dense wavelength division multiplexing (DWDM) fiber optic networks have led to interest in developing the means to switch optical wavelengths (or lambdas) directly, rather than the conventional methods which require performing optical to electrical conversion, switching the electrical data, then converting back to the optical domain. Lambda switching technology transmits many high speed (2.5 to 10 Gbit/s or higher) data streams over a common fiber optic cable using different wavelengths of light; but unlike conventional DWDM, lambda switching also incorporates a set of emerging industry protocols to manage higher level functions such as switching and routing. These functions provide the ability to engineer traffic (specify how, when, and where data flows), ease network management, increase fault tolerance and reliability by providing redundant lambda paths, and implement new types of network topologies including ring mesh.

The key to lambda switching is the ability to automatically connect the endpoints in an optical network. Conventional networks require tedious, expensive configuration of each device, fiber, and protocol in the network; this approach is prone to errors which may leave critical data paths unprotected or exposed to potential single points of failure. Lambda switching automatically reconfigures the network by integrating the switching functions with higher level protocols; thus network designs can be constructed which would have previously been impossible to manage. There are many devices in a lambda switched network, including optical cross-connects (OXCs), DWDM devices, and others; the key to making all of these devices work together is the ability to share information about the network topology between all attached devices. This requires some form of inband communication path within the lambda switched network.

Conventional lambda switching proposals require a separate optical wavelength channel to be reserved for advertising network information to all attached devices. This information may include which devices on the network can be reached by which paths, available bandwidth, quality of service, and extensions of current internet routing protocols such as Open Shortest Path First (OSPF) to determine the optimal paths for data flowing through the network. Using this information, lambda switching devices can each construct a network topology map (or traffic engineering table) as a basis for subsequent wavelength switching operations. This is a self-constructed topology map, which changes over time without requiring input from the end users.

When a connection over the network is required, the ingress OXCs can transmit setup messages requesting that the downstream OXCs allocate one or more wavelength channels for the data. This signaling will likely be accomplished using emerging standards such as Multi-Protocol Label Switching (MPLS), or adaptations of the Resource Reservation Protocol (RSVP) currently employed on internet connections. To engineer the traffic flow, extended MPLS or RSVP messages must flow over the network, using paths set up by the traffic engineering tables. Alternately, traffic flow can be handled by routers that manage the network against some connection criteria, such as bandwidth utilization. Fault tolerance is achieved by requesting backup light paths, and services such as virtual private networks (VPNs) can be implemented. After processing the setup messages, the OXCs would signal successful light path resource allocation by passing MPLS or RSVP messages to upstream neighbor devices. The optical connection is completed and ready to transmit data from the edge of the network devices when each OXC between the two endpoints has assigned a label to the light paths.

The basis of wavelength switching is the ability of network devices to transmit their state and reachability information inband over the network. Based on this, wavelength routers build granual network topology tables automatically. It is then required that the wavelength routers send requests for primary and backup light paths to selected devices, which acknowledge when the light paths are labeled and ready for use. Thus, there is a great deal of control information passing around the network. One approach to realizing this model is to dedicate a separate control wavelength on the network to carry this information. This approach has some drawbacks; a failure in the single laser transmitting this wavelength for each device means that the device is no longer visible to the network fabric. Further, there are both technology and industry standards which limit the maximum number of wavelengths on the network to around 30–60, with each wavelength running at speeds of up to 10–40 Gbit/s or higher. It is not efficient to remove 40 Gbit of bandwidth from the network as overhead to implement the lambda switching control channel; this inefficiency will only increase over time, as channel modulation rates become higher.

SUMMARY OF THE INVENTION

An object of this invention is to provide an optical network in which control information is distributed throughout the network and carried redundantly over each wavelength that is also carrying data.

Another object of the present invention is to modulate optical data using conventional means, and to add network control information by modulating the wavelength of the same optical sources used to carry the data.

These and other objectives are attained with a method and system for modulating an optical signal to encode data therein. The method comprises the steps of directing the optical signal through a filter mechanism having a passband function including a center wavelength, and modulating the center wavelength of the optical signal to establish a difference between the center wavelengths of the filter mechanism and the optical signal to represent a data value.

With the preferred implementation of the invention, a transmit device is used to encode the data in the optical signal, and a receive device is provided to decode the signal. The transmit device modulates the center wavelength of the optical signal to establish a difference between the center wavelength and a predefined wavelength to encode data in the optical signal, and the transmit device then transmits the optical signal. The receive device receives the optical signal from the transmit device and processes that signal to identify the encoded data.

For example, the represented data may be analog data, and the modulating step includes the steps of (i) providing a look-up table having wavelength differences associated with data values, (ii) obtaining from the look-up table a wavelength difference for a given data value, and (iii) encoding the given data value in the optical signal by establishing the obtained difference between the center wavelengths of the filter mechanism and the optical signal.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
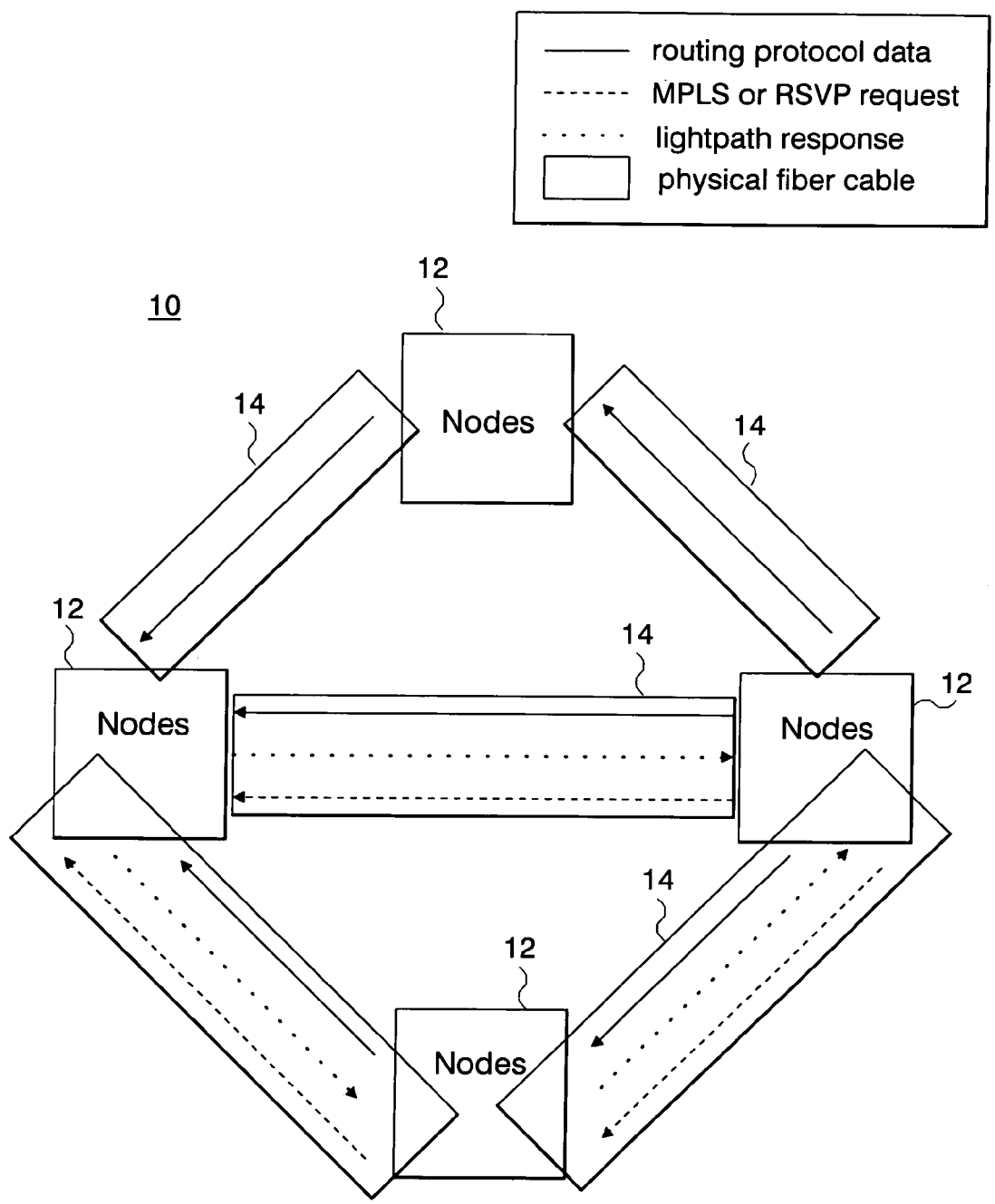
FIG. 1 is an exemplary illustration of a lambda switched network.

FIG. 1 generally illustrates a lambda switched network 10 with which the present invention may be used. Generally, network 10 comprises a plurality of nodes 12 and data links 14. In the operation of network 10, optical signals are generated, encoded with data and transmitted within and throughout the network to distribute data among the nodes and other devices of the network. As discussed above, a key to the operation of network 10 is the ability to share information between all attached devices.

In accordance with the present invention, control information is distributed throughout the network 10 and carried redundantly over each wavelength that is also carrying data. In order to do this without reducing the available network bandwidth, we modulate the data using conventional means and add the network control information by modulating the wavelength of the same optical sources used to carry the data. Wavelength modulation would not affect the bandwidth available for other types of data. However, it does require a precise method of controlling and changing the laser wavelengths to impose MPLS or RSVP encoding. Preferably, as discussed below, this function is realized using a wavelength-locked loop.

Figure 2:
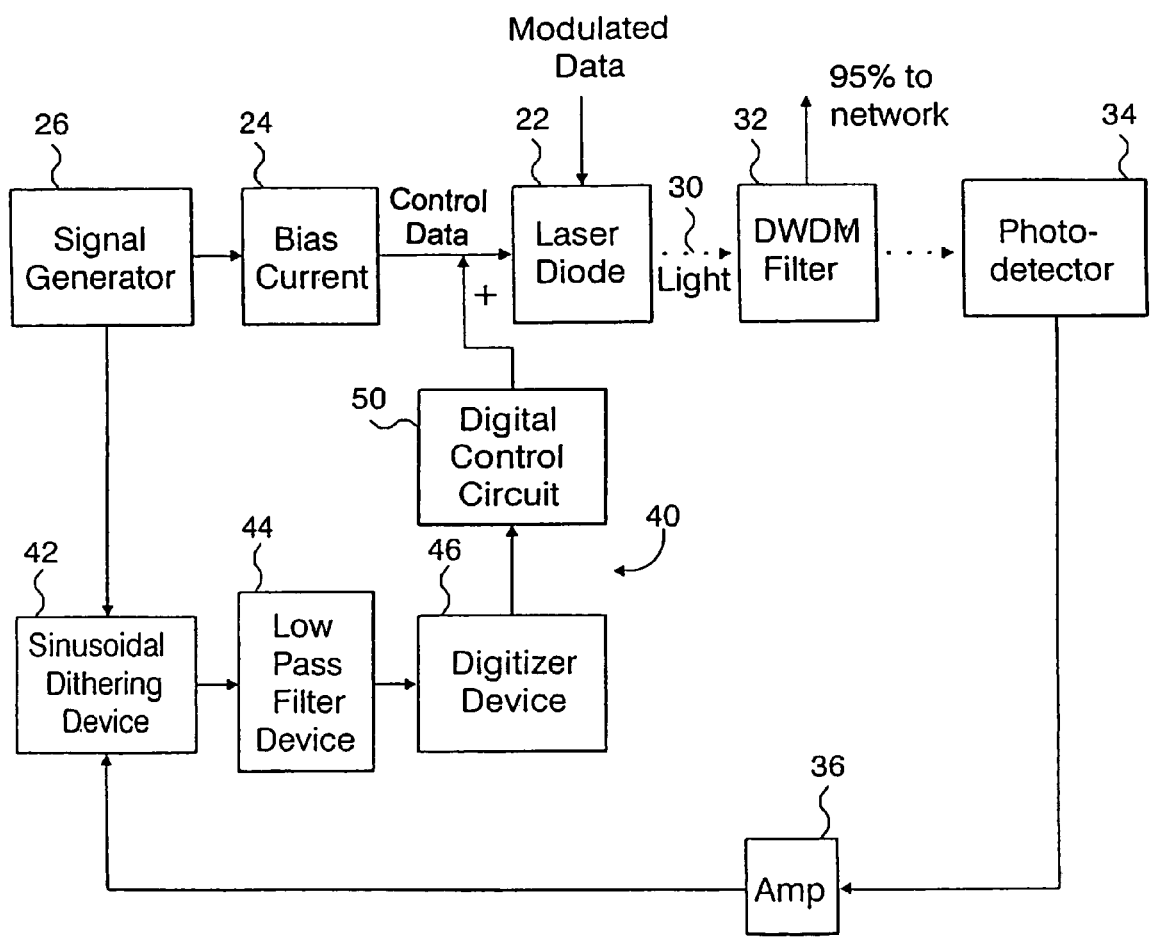
FIG. 2 is a block diagram showing a system for adding network control information to an optical signal.
Figure 3:
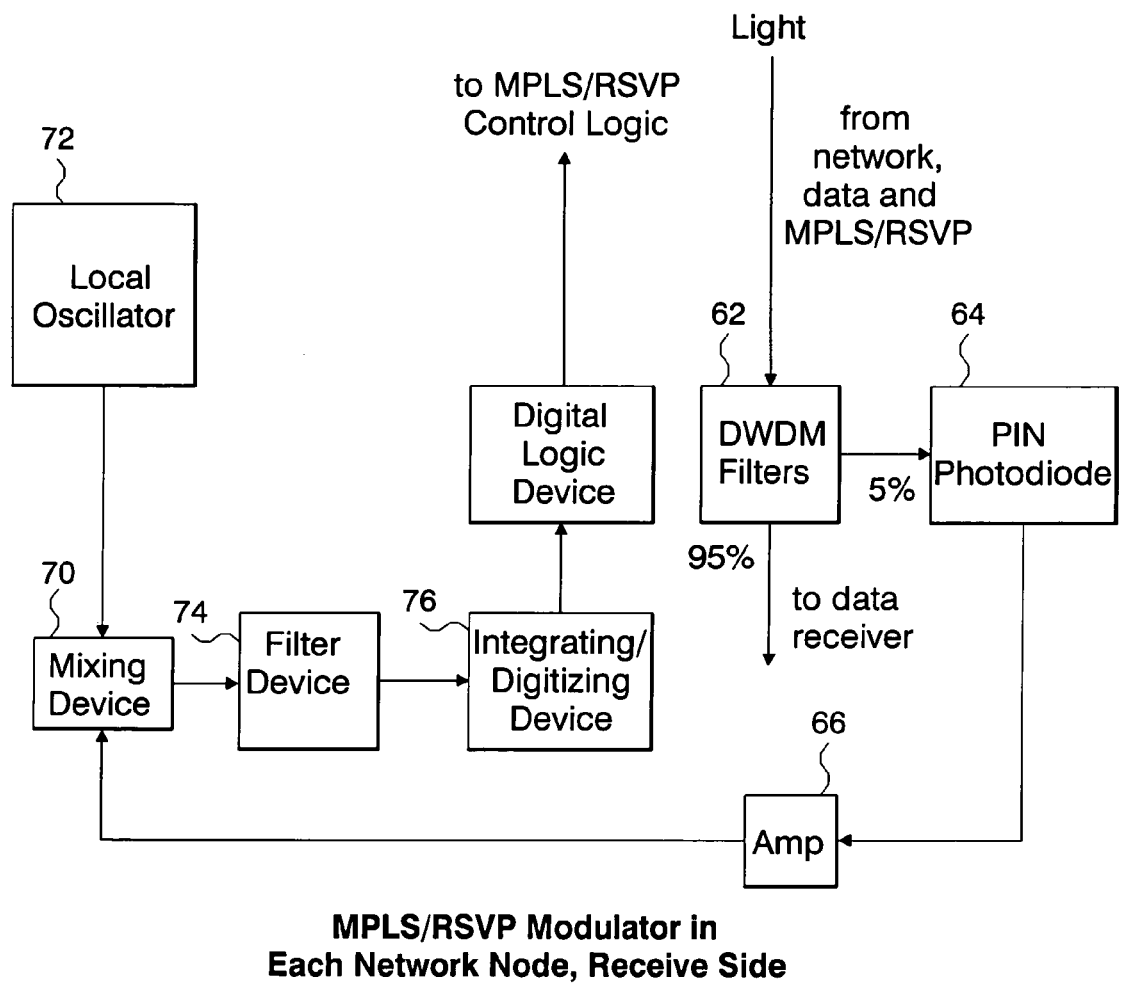
FIG. 3 is a block diagram showing a system for reading the network control information.

The basic approach is illustrated in FIGS. 2 and 3; there are two parts to this system, one each at the transmit and receive side of the link. The laser diode's 22 wavelength is controlled by the bias current from 24 in this embodiment, although other applications are possible (for example, using feedback to thermoelectric coolers to vary the wavelength by controlling the laser temperature). The laser voltage bias is modulated by a dithering current from the signal generator 26 at a low modulation frequency (kHz or less is adequate; this may be adjusted as needed to avoid interference with other operating frequencies in the system). Variations in the laser bias produce a corresponding dither in the center wavelength of the laser output 30. Normal DWDM wavelength spacing is about 0.8 to 1.6 nm, which means that we can modulate the laser center wavelength over a range of about 0.4 to 0.8 nm without interfering with adjacent channels in the network. As an example, the wavelength given by (nominal −0.4 nm) might represent a logical zero, while the wavelength represented by (nominal +0.4 nm) might represent a logical one.

Wavelength modulation can be implemented without affecting the use of the laser for amplitude, phase, or other modulation schemes; thus, we can use wavelength modulation for the MPLS/RSVP data and another modulation scheme for data (not related to network management functions). In this case, we keep the wavelength modulation small enough so that there is negligible amplitude modulation of the laser light as it passes through the bandpass filter 32 (as a design enhancement, we recognize that the filter rolloff can be designed to accommodate this wavelength modulation, or off the shelf filters can be used with minimal crosstalk penalty).

The output light from the DWDM filter 32 passes through a beamsplitter, which samples a small portion of the light (about 5%) to a photodetector 34. The detector's electrical output signal is amplified at 36 and fed back to a control circuit 40, where it is multiplied at 42 by the original sinusoidal dither used to modulate the laser diode wavelength. This results in the cross product of the two signals; by low pass filtering the result at 44 to remove higher order terms, then integrating and digitizing the result at 46, we obtain a signal which is proportional to the offset between the laser and filter center wavelengths.

In this way, this signal contains information on the change in the laser center wavelength; a digital control circuit 50 can be used to impose the MPLS/RSVP data onto this signal. The digital logic control circuit's function is to compare the state of the optical output from the laser/filter combination with the desired state of the MPLS/RSVP digital data sequence being transmitted over the communication link. If it is desired to transmit a logical 1 or 0 in the MPLS/RSVP data, then the laser wavelength is adjusted accordingly. This control signal is then fed back into the laser diode drive voltage which modulates the optical wavelength. In this manner, this invention is used to produce a state machine which affects external wavelength modulation of the laser diode output power.

Another advantage of this invention is that it generalizes to more than just a binary modulation system; in fact, it is possible to implement multi-level signaling using this approach. In the binary case, the transmitted output power is modulated to either a logical 0 or 1. Various intermediate cases are also possible; depending on the rolloff of the filter function, the laser and filter combination may be adjusted to any state in between these two extremes. This has advantages for possible encoding schemes for the MPLS/RSVP data. Thus the invention is not limited in its applications to digital wavelength modulation only, but also may be used to provide analog wavelength modulation. These different cases can be realized by using the proper driver logic and lookup tables in the embodiment of the invention.

At the far end of the lightwave path, the wavelength modulated data must be received and decoded by the attached device. This is shown in FIG. 3. When light enters the DWDM filters 62 in the receiver device, most of the light is passed to the DWDM data receiver and a small percentage is split off to a PIN photodiode 64. This signal is then amplified at 66, and mixed at 70 with a local oscillator 72 which is operating at the same frequency as the dither at the transmit end of the link (in practice, there would be a different oscillator frequency for each wavelength channel on the link). By mixing the local oscillator with the received signal, filtering at 74, integrating, and digitizing at 76, we can recover the signal which determines the offset between the laser nominal center wavelength and the wavelength modulation (this assumes the DWDM filters are properly centered on the laser center wavelengths with a large enough bandwidth to capture the wavelength modulation without inducing optical crosstalk with adjacent wavelengths). A digital logic device at this point will be able to decode the wavelength modulated MPLS/RSVP data (assuming it has been previously programmed with the same encoding scheme as the transmit side). In this way the invention realizes the means for passing MPLS/RSVP data over the network without reducing the available bandwidth for other applications.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

The invention claimed is:

1. A method of encoding data in an optical signal including a center wavelength, the method comprising:
    directing the optical signal through a filter mechanism having a passband function including a center wavelength; and
    changing the length of the center wavelength of the optical signal to establish a difference between the lengths of the center wavelengths of the filter mechanism and the optical signal, wherein the difference between the lengths of the center wavelengths of the filter mechanism and the optical signal represents data;
    wherein:
    the represented data are analog data; and the changing step includes the steps of
    i) providing a look-up table having wavelength differences associated with data values,
    ii) obtaining from the look-up table a specified wavelength difference for a given data value, and
    iii) encoding the given data value in the optical signal by changing the length of the center wavelength of the optical signal to establish the specified wavelength difference between the center wavelengths of the filter mechanism and the optical signal.

2. A method of using a single optical signal in an optical network to carry both network data and control data, said optical signal including a center wavelength, the method comprising:
    using a wavelength modulation scheme to add the control data to the optical signal, and using another modulation scheme to add the network data to the optical signal; and
    directing the optical signal through a filter mechanism having a passband function including a center wavelength;
    wherein the step of using the wavelength modulation scheme includes the step of changing the length of the center wavelength of the optical signal to establish a length difference between the lengths of the center wavelengths of the filter mechanism and the optical signal, wherein the difference between the lengths of the center wavelength of the filter mechanism and the optical signal represents data; and
    wherein the control data are analog data, and the changing step includes the steps of
    i) providing a look-up table having wavelength differences associated with data values,
    ii) obtaining from the look-up table a specific wavelength difference for a given data value, and
    iii) encoding the given data value in the optical signal by changing the length of the center wavelength of the optical signal to establish said specific wavelength difference between the center wavelength of the filter mechanism and the center wavelength of the optical signal.

3. A method according to claim 2, wherein the optical signal has a multitude of defined, digital states, and comprising the further steps of providing a feedback circuit, using the feedback circuit to compare a measured state of the optical signal with said defined digital states, and adjusting the optical signal to match one of the defined digital states.

* * * * *